(No Model.)
A. EGNEW.
POKE.
No. 337,386. Patented Mar. 9, 1886.
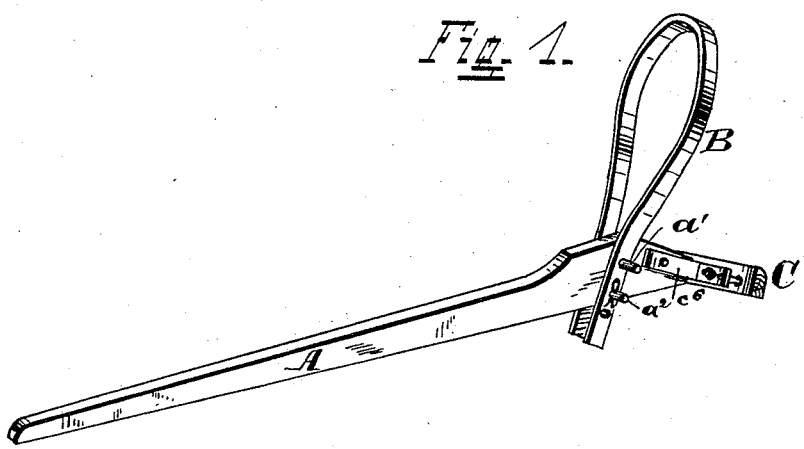
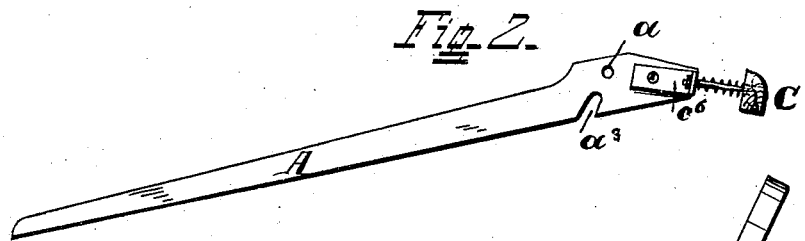
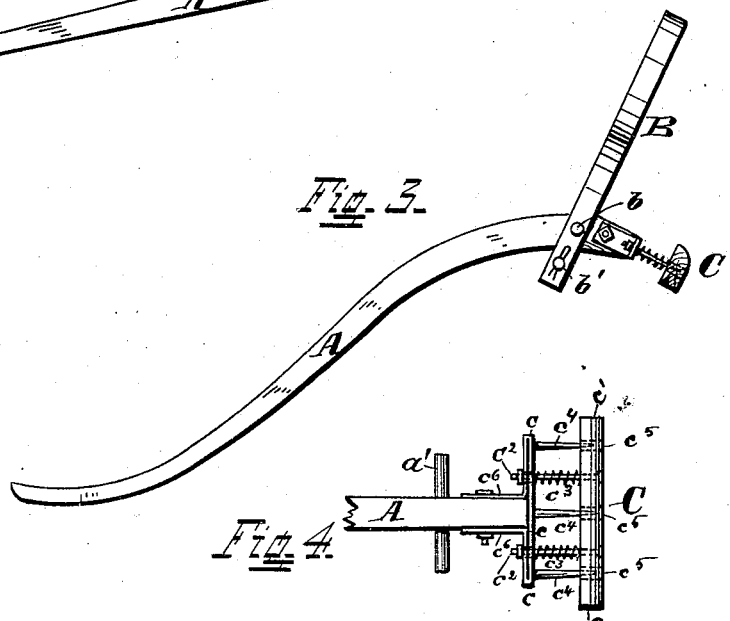
Attest
Carl Spengel
Alvin Egnew Inventor
By Harper & Blakemore Attys

UNITED STATES PATENT OFFICE.

ALVIN EGNEW, OF NEAR LEESBURG, KENTUCKY.

POKE.

SPECIFICATION forming part of Letters Patent No. 337,386, dated March 9, 1886.

Application filed August 11, 1885. Serial No. 174,090. (No model.)

*To all whom it may concern:*

Be it known that I, ALVIN EGNEW, a citizen of the United States, residing near Leesburg, in the county of Harrison and State of Kentucky, have invented certain new and useful Improvements in Animal-Pokes, to prevent horses and other animals from jumping over, crawling through, or breaking down fences, of which the following is a specification.

My invention consists in devices for locking or preventing the bar or pole from turning on the pin by which it is pivoted to the bow.

It also consists in the peculiar form of bar or pole used, and in the combination and arrangement of the various parts.

In the drawings, Figure 1 is a view of my improved animal-poke. Fig. 2 shows the bar or pole of the same, with the apertures therein; Fig. 3, a side view of my device, and Fig. 4 a detail view of the prodding device.

A is the bar or pole, which may be either curved or straight, and has an aperture, $a$, to receive pin $a'$, by which it is pivoted to the bow B. The bow has two or more apertures, $b$ and $b'$—one to receive the pin $a'$, by which the pole is pivoted to the bow, and the other to receive pin $a^2$, which runs through slot $a^3$, and thus prevents the bar or pole from being turned on pin $a'$. This slot may be made either in the upper or lower edge of the pole, in the drawings it being shown on the lower side, I considering that preferable.

C is the prodding device. It is placed directly at the end of the bar or pole. It consists of a plate, $c$, and shield $c'$, which are held together by two or more bolts, $c^2$, with their stationary ends in the shield, the other ends sliding freely through holes in plate $c$. Around these bolts are coiled springs $c^3$, to press the shield outward and cover the points $c^4$, the requisite number of which are securely fastened to plate $c$. The sharpened ends of these points or prods project into apertures $c^5$ in the shield.

My preferable mode of attaching the prodding device to the bar or pole is to turn the ends of plate $c$ at right angles and extend them so as to serve as straps, $c^6$, between which the pole is admitted and securely bolted.

There are many other modes in which the prodding device may be fastened to the pole, which it is unnecessary to describe.

All the various forms of animal-pokes in use have been largely unsuccessful. They have not prevented animals from getting over or through a fence, or breaking it down. This result is attributable, chiefly, first, to the bar or pole revolving on the pin, so that the animal can throw it up onto the fence or at one side of its head, so as to get the pole out of its way, and second, to the prods not operating directly by pressure against the pole. There is nothing to prevent the pole being thrown up out of the way, and the prods are uncovered only by the indirect pressure of the horse's neck upon the cross plate or bar to which they are attached, and even when uncovered the prods strike the animal obliquely, if at all, instead of directly. All these defects are overcome in my device. These objections have been sought to be overcome by other devices—such as by extending two bars or poles rearwardly, one at each side of the animal, and in other ways; but these have been complicated and of such a character as to entangle and endanger crippling the animal.

My device is so simple in its construction and of such a character that there is no danger in this direction. The cheapening of the cost of its manufacture, by reason of this simplicity will also be an advantage in its favor.

I claim as new and desire to secure by Letters Patent—

1. In combination with pole A, prodding device C, secured to the end thereof, bow B, pivoted to pole A, and pin $a^2$, passing through bow B, and serving to limit the movement of the latter.

2. In combination with pole A, having slot $a^3$, pivoted bow B, pin $a^2$, passing through bow B and into slot $a^3$, and a prodding device, C, all arranged as shown.

3. In combination with pole A and pivoted bow B, plate $c$, rigidly secured to the end of pole A, shield $c'$, provided with apertures $c^5$, bolts $c^2$, rigidly secured to shield $c'$ and passing loosely through plate $c$, spring $c^3$, encircling said bolts, and pins $c^4$, rigidly attached to plate $c$, and projecting through the apertures $c^5$, as and for the purposes described.

ALVIN EGNEW.

Witnesses:
WILLIAM S. HARTLEY,
J. C. HARPER.